Patented June 1, 1948 2,442,429

UNITED STATES PATENT OFFICE 2,442,429

METHOD OF EXTRACTING URANIUM, RADIUM, AND VANADIUM FROM THEIR ORES

Ralph D. Nye and Dana J. Demorest, Columbus, Ohio

No Drawing. Application May 4, 1946, Serial No. 667,482

5 Claims. (Cl. 23—18)

1

The present invention relates to an improved process for treating carnotite and similar uranium, vanadium and radium-containing ores. In the past, treatment of such ores has generally been confined to the object of obtaining vanadium concentrates alone. Various processes to accomplish this result are known and the most commonly used is termed the salt roasting method in which the ores are treated with an amount of sodium chloride and roasted at a temperature in the neighborhood of 850° C. and at the same time stirred and rabbled on a furnace hearth for several hours to form soluble compounds of vanadium with the sodium of the salt, namely, sodium vanadate. In some of the carnotite type ores large amounts of calcium and magnesium carbonates and like compounds exist which in the salt roast process tend to form compounds with sulphur and render the vanadium unsuitable for commercial uses. Also such carbonates and like compounds, if they amount to more than half of the vanadium oxide content seriously interfere with the concentration, separation and purification of the vanadium by the salt roasting operations so that control of them is of great importance.

It is a general object of our invention to provide an improved method for processing carnotite ores in order to obtain therefrom mechanically concentrates of vanadium and chemically concentrates of uranium, radium and vanadium.

It is another object of our invention to provide an improved method, especially adapted for the chemical treatment of low grade ores of the carnotite type which contain compounds of uranium generally about 0.5% of uranium oxide ($U_3O_8$) and radium in such small percentages as may preclude, without this chemical treatment, their economical commercial utilization.

It is still another object of our invention to provide a process of this character in which the vanadium containing carnotite ores having high percentages of calcium and like compounds are rendered suitable for further separation and chemical purification of their vanadium by the salt roasting process thru the elimination and conversion of excessive amounts of troublesome calcium, magnesium and like compounds occurring in ores of this type, above such amounts as may be tolerated in the salt roast operations.

For a further understanding of our invention, reference is made to the following description which for purposes of clarification and division is outlined in step-form.

Step 1 of the present invention provides for milling and grinding the carnotite or other similar ores to a relatively finely divided state of which the grains approximate the size of 40 mesh. The purpose of the milling and grinding is to separate the greater portion of cementing materials, which contain the desired mineral values, from the valueless siliceous sand grains.

2

Step 2 comprises the treating of the milled and ground ore with a heated alkali carbonate solution, such as sodium, or potassium carbonate. To promote intimacy of contact between the carbonate solution and the ore, the mixture is agitated and stirred to remove cementing materials from sand grains and complete dispersion of the mineral values through the sodium carbonate solution. The ore, while being heated and stirred, remains in contact with the carbonate solution only a sufficient length of time for it to react with all of the uranium oxide and to disperse the radium in the solution before the mixture is taken off for further leaching processes hereinafter described.

It will be manifest that in the reaction between heated carbonate solution and the ore, certain bituminous and organic materials and very finely divided sand grains, hereinafter referred to as fines and slimes, contained in the latter will be partially dissolved and/or held in colloidal suspension in the solution, making it a dark brown color. Also a portion of the organic materials will be floated towards its surface by the foamy and soapy action of the carbonate solution.

The amount of alkali carbonate used in this step is proportioned to the uranium oxide content of the ore, and the time of treatment is adjusted so that all of the uranium oxide goes into solution and most of the radium is dispersed within the solution without the carbonate reacting largely with the vanadium oxide. However, it will be understood that a small portion of vanadium oxide which may exist in the pentavalent form, possible about 2% or 3% of all vanadium in the ore, will tend to be dissolved in the carbonate solution.

Step 3 comprises mechanically washing the ore and carbonate solution with water in a manner so as to remove the dark brown colored solution and its suspended fines and floating slimes from a residue of coarse sand grains. This may easily be accomplished by passing the treated ore into a vertically positioned receptacle having drain-means located substantially at the top thereof, and admitting water to the bottom of the receptacle, by forcing it either through conduit means introduced in the bottom of the receptacle or by conduit extending toward the bottom of the vessel. At the same time the washing takes place, the solution and sand grains may be stirred and agitated to insure that all the value-slimes are carried away from the sand residue. After washing out all of the brownish colored carbonate solution and slimes, the residue of coarse sand is de-watered and retained for further processing. In this operation, very fine sand grains below the size of approximately 150 mesh and cementing material slimes are removed by the rising currents and the flotation effect of the soapy carbonate solution. Such slimes and fines will constitute approximately 25% of the original weight of the ore. In addition to the slimes and fines, all of the uranium and most of the vanadium and radium content, which radium is dispersed in close association with the uranium compounds, is carried away in the carbonate solution and in the bituminous organic material in solution or suspension therewith.

The coarse sand residue amounts to about 75% of the original weight of the ore and may contain below half of its vanadium oxide. In it occur some calcite grains or calcium carbonate with the sand grains above about 150 mesh size. Any troublesome excess of calcium which exists in this porous coarse sand may be easily treated by percolating dilute sulphuric acid through it, sufficient to convert only the excess calcium into its sulphate form so that it will not impede in a later salt roasting operation, if such operation is used to obtain vanadium from these coarse sands.

In step 4, sulphuric acid is slowly added to the dark brown colored carbonate solution washed out of the treated ore while the latter is stirred or agitated, as by blowing air into the bottom of the containing vessel to drive out carbon dioxide gas and to agitate the various fines and slimes. When the solution is sufficiently acid and free of carbon dioxide so as to take all the uranium and most of the radium into it, that is approximately pH 5 acidity, a solution of a metallic salt capable of reacting with the sulphuric acid to form a dense flocculent precipitate, is fed into the acid solution to carry down, all of the bituminous organic matter which may be coloring the solution dark brown and the fines which may be held in colloidal suspension. Preferably, the metallic salt used is barium chloride. However, various other compounds such as lead chloride may be used with substantially the same effect. The precipitation of these sulphates, also the cementing materials and fines, which settle out of the solution, will clarify it and concentrate a large part of the vandadium content of the ore, probably above half of it, into the sludge precipitate thus formed. As soon as the solution has clarified, the supernatant clear portion is removed by siphoning or decanting to another vessel for further treatment. The sludge is then transferred to a rotary or other type filter where the remaining acid solution is extracted from it and the filtrate is added to the decanted clear supernatant portion of the solution. The sludge is then allowed to dry, and retained for further treatment as hereinafter described.

It will be seen that the sludge, consisting of sandstone cementing materials, with organic slimes and fines from this step will have had its calcium and magnesium content changed to the sulphate form by the sulphuric acid treatment. It will also be manifest that the sludge at this point is a mechanically made concentrate of vanadium and is particularly adapted for the further concentration of its vanadium content by a salt roasting process, due to the fact that it is in fine form so it may easily be mixed with salt and undesirable calcium and magnesium ions have been more or less rendered inert.

In step 5, the clear supernatant acid solution and filtrate from the sludge from step 4, containing compounds of uranium and radium and possibly small percentages of vanadium, having been combined, are now made sufficiently alkaline by adding a suitable alkali base as caustic sodium, potassium or ammonium hydroxide. After the addition of adequate caustic base to the acid solution, a precipitate of radium, uranium and traces of vanadium compounds is formed. It will be understood that in processing ores of this type, some alumina may be found in the acid solution, and its precipitation may be prevented by adding sufficient caustic soda so as to retain it in solution.

The precipitate formed from the caustic base treatment, when using sodium hydroxide, is filtered, washed, dried and calcined so that it is substantially a sodium uranate with closely associated compounds of radium, also possibly some vanadium, and in itself forms the value concentrate of uranium and radium compounds which is in suitable form for further chemical purification and separation from it of radium, uranium oxide ($U_3O_8$) and vanadium oxide ($V_2O_5$) by standard chemical processes.

The filtrate from this operation, which is a clear liquid, if substantially a sodium hydroxide solution, may be retained and modified for use as wash water for repeated operations as described in step 3 or for other suitable purposes. This solution may easily be reactivated by allowing same to absorb carbon dioxide from the atmosphere for a length of time or gases from combustion may be forced through the solution so sodium carbonate forms which would render same particularly useful in the previously described washing and treating step 3 of this operation.

The carnotite ore, having been treated by the above described process to extract the uranium and radium, is benefited for use of the salt roasting process to extract the vanadium from it as it is milled ready for mixture with salt and any excessive calcium has been made inert.

Step 6 comprises the uniting and mixing with salt of the coarse sand grains left from step 3 and the sludge precipitate obtained from step 4, both of which contain nearly all of the vanadium content of the ore. Such a mixture is particularly adapted for the salt roasting process, as previously described, due to the fact that excessive calcium and magnesium sometimes occuring in the original ore, are in a sulphate form and will not tend to be detrimental in the process. The calcium in this sulphate form will be relatively insoluble in various solutions used when the roasted ore is leached. If in solution calcium ions would interfere with recovering a superior amount and grade of vanadic acid as end products of the salt roasting process when an acid is added to the pregnant solution containing sodium vanadates to precipitate the vanadium pentoxide.

In view of the foregoing, it will be seen that our process provides a means whereby uranium, vanadium and radium occuring in carnotite ores may be easily placed in a concentrate form, and rendered suitable for various subsequent processes and treatment in connection and chemical purification. This process makes possible the economical recovery of uranium and radium compounds, which normally are wasted in ordinary processes, and may thus be rendered of a suitable volume and weight to allow of economical shipment and further transportation to various refineries or purification plants for the purpose of further chemical separation and isolation, to obtain radium, uranium oxide ($U_3O_8$) and vanadium oxide ($V_2O_5$).

Most of the vanadium contained in the ore and some of the radium is concentrated in the sludge portion of the treated ore so that this sludge may be disposed of as a concentrate if commercial conditions justify that, and the coarse sand portion can be treated by salt roasting, or otherwise, to obtain the vanadium from it. Thus, the coarse sand may be treated with HCl gas for extraction of the vanadium, as per our co-pending application, Serial No. 521,840, filed February 10, 1944.

It will be manifest that the various steps comprising our process may be carried out by the use of simple equipment and reagents which may be set up and operated in proximity to a mining area. It will be further understood that by modifying and utilizing the sodium hydroxide filtrate from step 5 as a washing liquid in step 3, a great amount of water will be saved. This reduction in the amount of water used in the process, per ton of ore, is very important due to the scarcity of water where much of the carnotite ore is mined, as this ore is usually found in semiarid districts. Thus it may be possible to treat the ore as mined where small amounts of water are available for the concentration of the value elements, of radium and uranium and so that the ore thereafter may be sold or processed to obtain the vanadium content from it.

We claim:

1. The method of treating ores containing uranium, vanadium and radium, which comprises mechanically reducing said ores to a relatively finely divided state, treating the reduced ores with a solution of an alkali carbonate and agitating same to insure complete surface contact between the two, washing the treated ores and solution with upward flowing currents of water to separate the solution and suspended fines and floating slimes from a residue of coarse sand grains, treating the washed solution and its fines and slimes with an acid sulphate until the solution is rendered acid, adding a solution of a metallic salt to precipitate an insoluble sulphate form of the metallic component of the salt and thereby to take suspended fines and slimes out of solution to obtain a supernatant solution and a sludge precipitate, mechanically separating said supernatant solution from the said precipitate, treating said supernatant solution with a caustic alkali base to precipitate concentrates of uranium, radium and vanadium compounds and produce a basic alkali solution, reactivating said basic solution for re-use in the said washing of the treated ores, and combining said sludge precipitate with said residue of coarse sand grains for further concentration of the remaining vanadium content by salt roasting the same.

2. The method of treating ores containing uranium, vanadium, and radium, which comprises mechanically reducing said ores to a relatively finely divided state, treating the reduced ores with a solution of an alkali carbonate, separating said solution from residue of ore grains, treating said solution with an acid sulphate, adding a metallic salt to said solution to precipitate an insoluble sulphate form of the metallic component of the salt and to obtain a sludge precipitate containing vanadium and a supernatant solution containing soluble uranium and radium compounds, and treating said supernatant solution with a caustic alkali base to precipitate relatively concentrated compounds of uranium and radium from a basic alkali solution.

3. The method of treating ores containing uranium, vanadium, and radium, which comprises mechanically reducing said ores to a relatively finely divided state, treating the reduced ores with a solution of an alkali carbonate, separating said solution from residue of ore grains, treating said solution with an acid sulphate, adding a metallic salt to said solution to precipitate an insoluble sulphate form of the metallic component of the salt and to obtain a sludge precipitate containing vanadium and a supernatant solution containing soluble uranium and radium compounds, treating said supernatant solution with a caustic alkali base to precipitate relatively concentrated compounds of uranium and radium from a basic alkali solution, and reactivating said alkali solution to a carbonate form for use as a reagent in subsequent treatments.

4. The method of treating ores containing uranium, vanadium, and radium, which comprises mechanically reducing said ores to a relatively finely divided state, treating the reduced ores with a solution of an alkali carbonate, separating said solution from remaining ore grains. treating said solution with an acid sulphate, adding a metallic salt to said solution to precipitate an insoluble sulphate form of the metallic component of the salt and to obtain a sludge precipitate containing vanadium and a clear supernatant solution containing soluble compounds of uranium and radium, separating said sludge precipitate from said supernatant solution, mixing said precipitate with said remaining ore grains, and heating and agitating the two in the presence of sodium chloride to form a vanadic acid concentrate.

5. The method of treating ores containing uranium, vanadium and radium, which comprises mechanically reducing said ores to a relatively finely divided state, treating the reduced ores with a solution of an alkali carbonate, heating and agitating same to insure complete dispersal of the radium and uranium, washing the treated ores and solution with upward flowing currents of water to separate the solution and suspended fines and floating slimes from a residue of coarse sand grains, treating the washed solution and its fines and slimes with an acid sulphate until the solution is rendered acid, adding a solution of a metallic salt to precipitate an insoluble sulphate form of the metallic component of the salt and thereby to take suspended fines and slimes out of solution to obtain clear supernatant solution and a sludge precipitate, mechanically separating said clear supernatant solution from the said precipitate, treating said supernatant solution with a caustic alkali base to precipitate concentrates of uranium, radium and vanadium compounds and produce a basic alkali solution, reactivating said basic solution for re-use in the said washing of the treated ores, and combining said sludge precipitate with said residue of coarse sand grains for further concentration of the remaining vanadium content by salt roasting the same.

RALPH D. NYE.
DANA J. DEMOREST.